US012798288B2

(12) United States Patent
Yang

(10) Patent No.: US 12,798,288 B2
(45) Date of Patent: Nov. 17, 2026

(54) WHEEL RIM HAVING REINFORCEMENT STRUCTURE

(71) Applicant: HSIN CHUAN IND. CO., LTD., Changhua County (TW)

(72) Inventor: Yu-Ling Yang, Changhua County (TW)

(73) Assignee: HSIN CHUAN IND. CO., LTD., Changhua County (TW)

( * ) Notice: Subject to any disclaimer, the term of this patent is extended or adjusted under 35 U.S.C. 154(b) by 180 days.

(21) Appl. No.: 18/914,249

(22) Filed: Oct. 13, 2024

(65) Prior Publication Data

US 2025/0249706 A1 Aug. 7, 2025

(30) Foreign Application Priority Data

Feb. 1, 2024 (TW) ................................ 113103884

(51) Int. Cl.
*B60B 21/10* (2006.01)
*B60B 21/02* (2006.01)

(52) U.S. Cl.
CPC .......... *B60B 21/102* (2013.01); *B60B 21/025* (2013.01); *B60B 21/104* (2013.01); *B60B 2900/311* (2013.01)

(58) Field of Classification Search
CPC .... B60B 21/025; B60B 21/102; B60B 21/104
See application file for complete search history.

(56) References Cited

U.S. PATENT DOCUMENTS 5,653,510 A * 8/1997 Osborne ............... B60B 21/062 301/95.104
6,138,730 A * 10/2000 Fotij ......................... B60B 3/00 301/95.104
6,183,047 B1 * 2/2001 Kuhl ..................... B60B 21/026 29/894.35
6,779,853 B1 * 8/2004 Chang ................... B60B 21/062 301/58
10,272,718 B1 * 4/2019 Quan .................... B60B 21/028
12,030,340 B2 * 7/2024 Dibout ................... B33Y 80/00
2008/0231106 A1 * 9/2008 Chen ..................... B60B 21/062 301/95.106
2009/0115240 A1 * 5/2009 Slate ..................... B60B 21/028 301/95.104

(Continued)

*Primary Examiner* — Jason R Bellinger
(74) *Attorney, Agent, or Firm* — Che-Yang Chen

(57) ABSTRACT

A wheel rim having a reinforcement structure is disclosed. The wheel rim has two connected side walls and a connecting wall. An outer peripheral edge is connected to each side wall. Either end of the connecting wall is connected to a connecting edge. The outer peripheral edge intersects the connecting edge. A joint portion is formed at an intersection of the connecting wall and the connecting edge. The joint portion is spaced from the corresponding side wall. A reinforcement edge is connected between each side wall and the connecting wall. A hollow support region is enclosed by the corresponding side wall, the outer peripheral edge, the connecting edge, the connecting wall and the reinforcement edge. The joint portion and the side wall do not concentrate external force on the side wall, thereby achieving the effect of reducing the external force acting on the wheel rim and dispersing the force.

9 Claims, 5 Drawing Sheets

(56) References Cited

U.S. PATENT DOCUMENTS

| | | | | |
|---|---|---|---|---|
| 2009/0195055 A1* | 8/2009 | Chen | B60B 1/044 | 301/95.104 |
| 2010/0270852 A1* | 10/2010 | Chen | B60B 21/025 | 301/95.104 |
| 2019/0308446 A1* | 10/2019 | Morse | B29C 70/865 | |

* cited by examiner

WHEEL RIM HAVING REINFORCEMENT STRUCTURE

BACKGROUND OF THE PRESENT INVENTION

Field of Invention

The present invention relates to a wheel rim, and more particularly to a wheel rim having a reinforcement structure, which can reduce the multiplication effect of external force on the wheel rim and can disperse the force, so as to achieve structural strengthening.

Description of Related Arts

Bicycle tires are assembled directly onto the wheel rim and are ready for riding. A conventional wheel rim 10, referring to FIG. 1 through FIG. 3, is an integral ring frame made of aluminum alloy. The wheel rim 10 includes an inner ring having two side walls 11 connected in a V shape and an outer ring having a connecting wall 12. An outer peripheral edge 13 is connected to the distal end of each side wall 11. The outer peripheral edge 13 extends inwardly and axially. Either end of the connecting wall 12 is connected to a connecting edge 14 extending radially. The outer peripheral edge 13 intersects the connecting edge 14. A joint portion 15 is formed at the intersection of the connecting wall 12 and the connecting edge 14. The joint portion 15 is connected to the corresponding side wall 11, so that a hollow support region 16 is enclosed by the corresponding side wall 11, the outer peripheral edge 13, the connecting edge 14, and the joint portion 15. The connecting wall 12, the outer peripheral edge 13 and the connecting edge 14 form a tire groove 17 for assembling a tire 18. With the above structure, after the tire 18 is filled with air, the support area 16 provides strength to resist the tension of the tire 18 and increases the clamping force on the tire 18, making the combination of the wheel rim 10 and the tire 18 more stable. However, since the joint portion 15 is coupled to the corresponding side wall 11, the external force on the connecting wall 12 and the connecting edge 14 are concentrated and transmitted directly to the side wall 11. Instantaneous excessive external force on the tire 18 (e.g., hitting a hole in the road) will easily cause the wheel rim 10 to protrude outwardly, wrinkle and deform at the junction of the side wall 11 and the joint portion 15 (as shown in FIG. 2). If the connecting wall 12 uses the joint portion 5 as a fulcrum so that its moment arm D1 is long (as shown in FIG. 3), the relative moment will be greater and the destructive force of the external force on the side wall 11 to "turn", "twist" or "bend" will be greater. As a result, there is a risk that the tire 18 will be deflated and disengaged from the tire groove 17. Therefore, it is necessary to improve the conventional wheel 10, which has the problem of over-concentration of force.

SUMMARY OF THE PRESENT INVENTION

In view of the shortcomings of the prior art, the primary object of the present invention is to provide a wheel rim having a reinforcement structure.

In order to achieve the forgoing object, the wheel rim provided by the present invention is an integral ring frame. The wheel rim includes an inner ring having two connected side walls and an outer ring having a connecting wall. An outer peripheral edge is connected to a distal end of each side wall. The outer peripheral edge extends inwardly and axially. Either end of the connecting wall is connected to a connecting edge extending radially. The outer peripheral edge intersects the connecting edge. A joint portion is formed at an intersection of the connecting wall and the connecting edge. The joint portion is spaced from a corresponding one of the side walls. A reinforcement edge is connected between each side wall and the connecting wall. A hollow support region is enclosed by the corresponding side wall, the outer peripheral edge, the connecting edge, the connecting wall and the reinforcement edge.

In one embodiment of the present invention, a predetermined distance is defined between the reinforcement edge and the joint portion.

In one embodiment of the present invention, the predetermined distance is between 3 mm and 6 mm.

In one embodiment of the present invention, the joint portion has a circular cross-section.

In one embodiment of the present invention, the joint portion has a diameter greater than a thickness of the connecting wall as well as the connecting edge.

In one embodiment of the present invention, the reinforcement edge is a linear edge wall.

In one embodiment of the present invention, the reinforcement edge is an L-shaped edge wall.

In one embodiment of the present invention, the reinforcement edges of the two side walls are bent toward each other.

In one embodiment of the present invention, the reinforcement edge is an inwardly curved edge wall, and the reinforcement edges of the two side walls are curved toward each other.

In one embodiment of the present invention, the reinforcement edge is an outwardly curved edge wall, and the reinforcement edges of the two side walls are curved away from each other.

With the above structure, the stress transmitted by the tire to the tire groove can be dispersed to the side wall, so that the external force on the side wall can be borne over a larger area. The wheel rim can withstand greater changes in external forces to prevent the wheel rim from creasing and deforming.

DETAILED DESCRIPTION OF THE PREFERRED EMBODIMENT

Embodiments of the present invention will now be described, by way of example only, with reference to the accompanying drawings.

Figure 1:
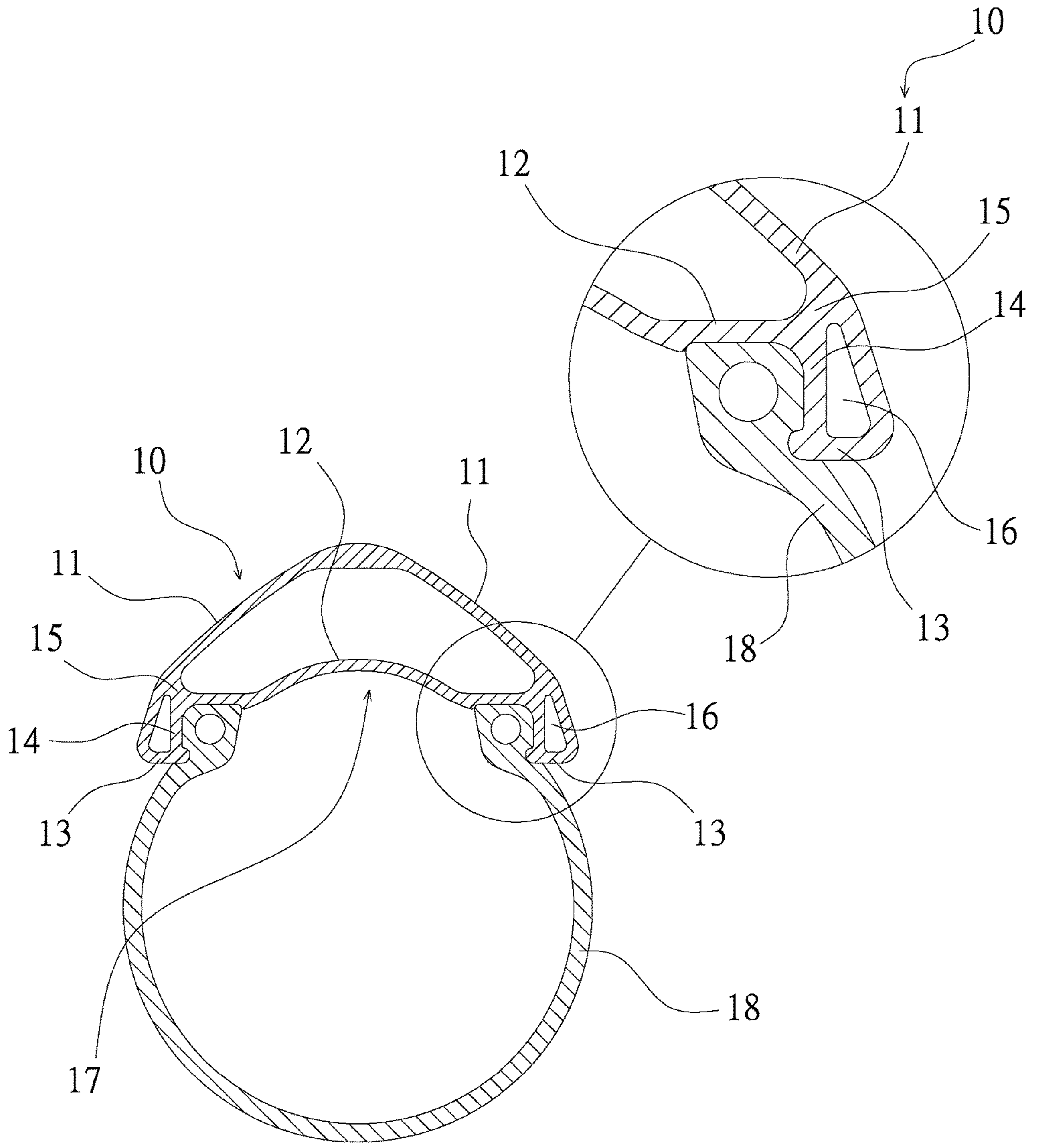
FIG.1 PRIOR ART
FIG. 1 is a cross-sectional view of a conventional wheel rim mounted with a tire.
Figure 2:
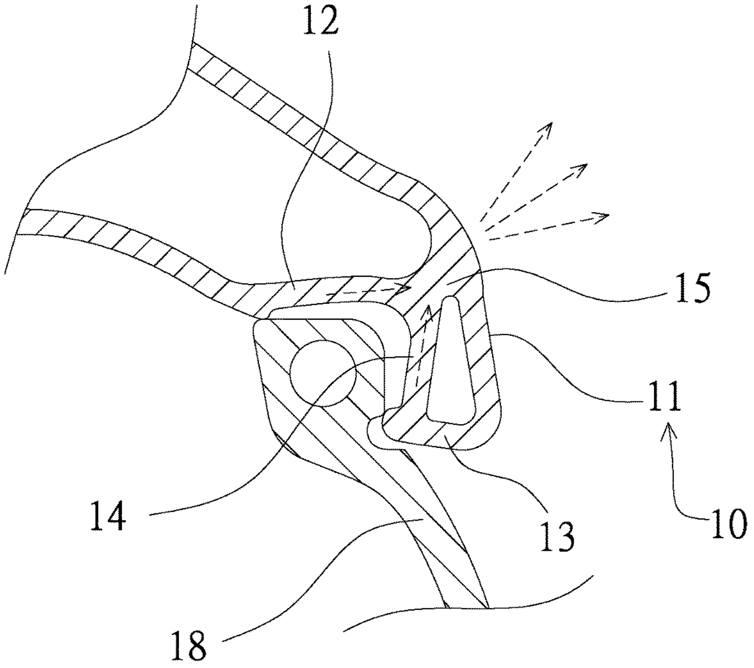
FIG.2 PRIOR ART
FIG. 2 is a partial cross-sectional view of the conventional wheel rim, wherein the wheel rim is deformed by concentrated external force.
Figure 3:
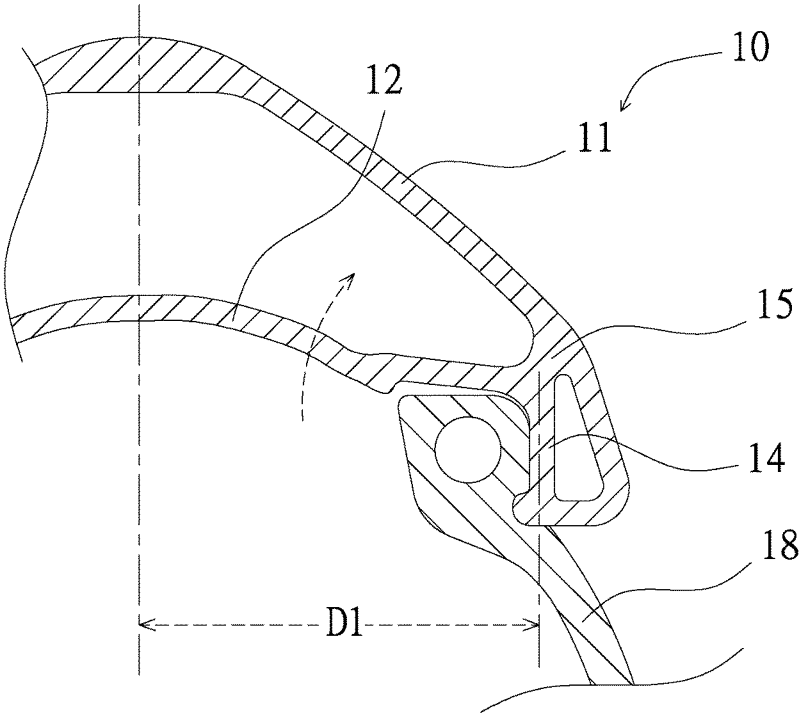
FIG.3 PRIOR ART
FIG. 3 is a partial cross-sectional view of the conventional wheel rim, wherein the wheel rim is deformed with the joint portion as the fulcrum.
Figure 4:
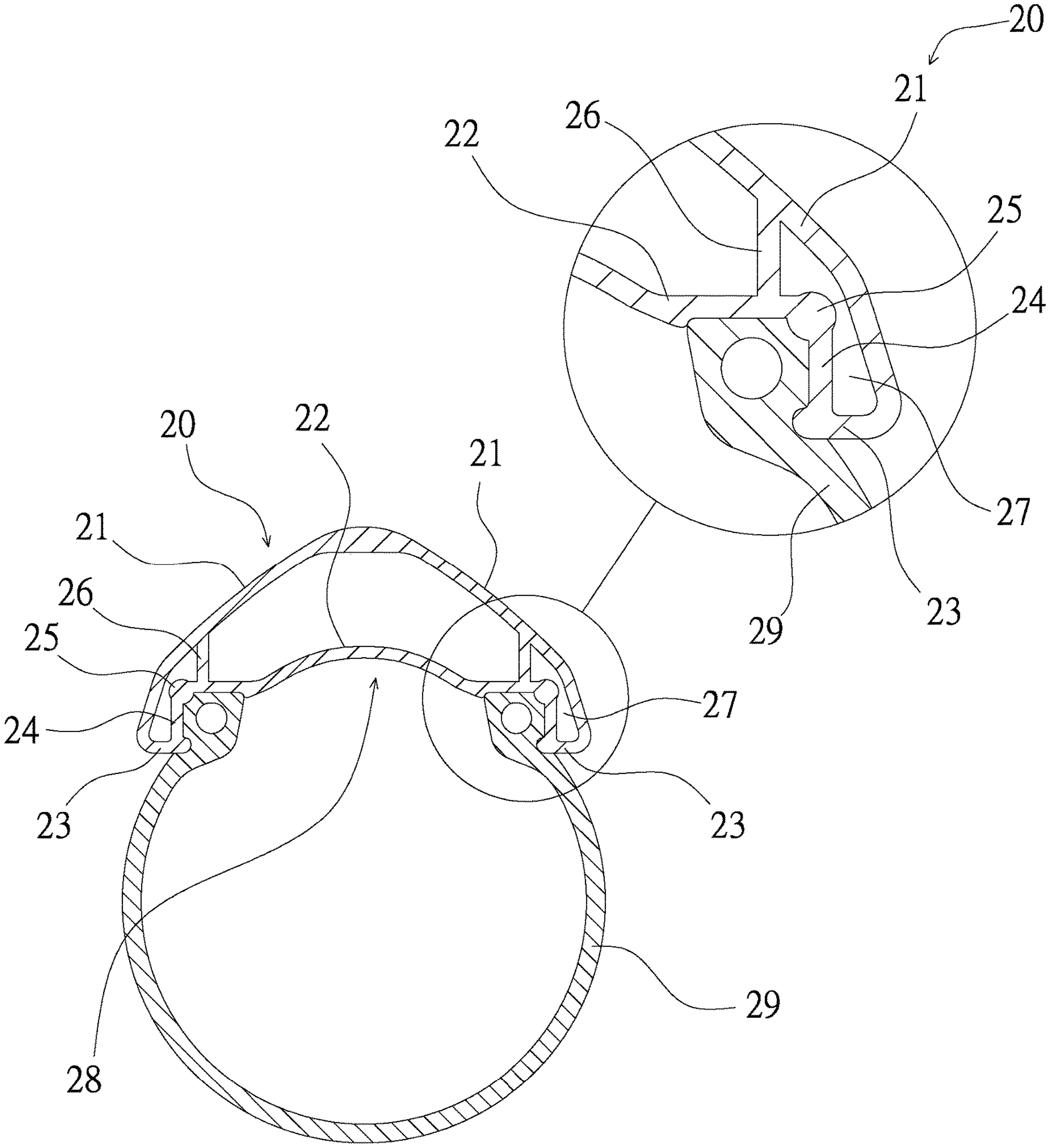
FIG. 4 is a cross-sectional view of the present invention mounted with a tire.
Figure 5:
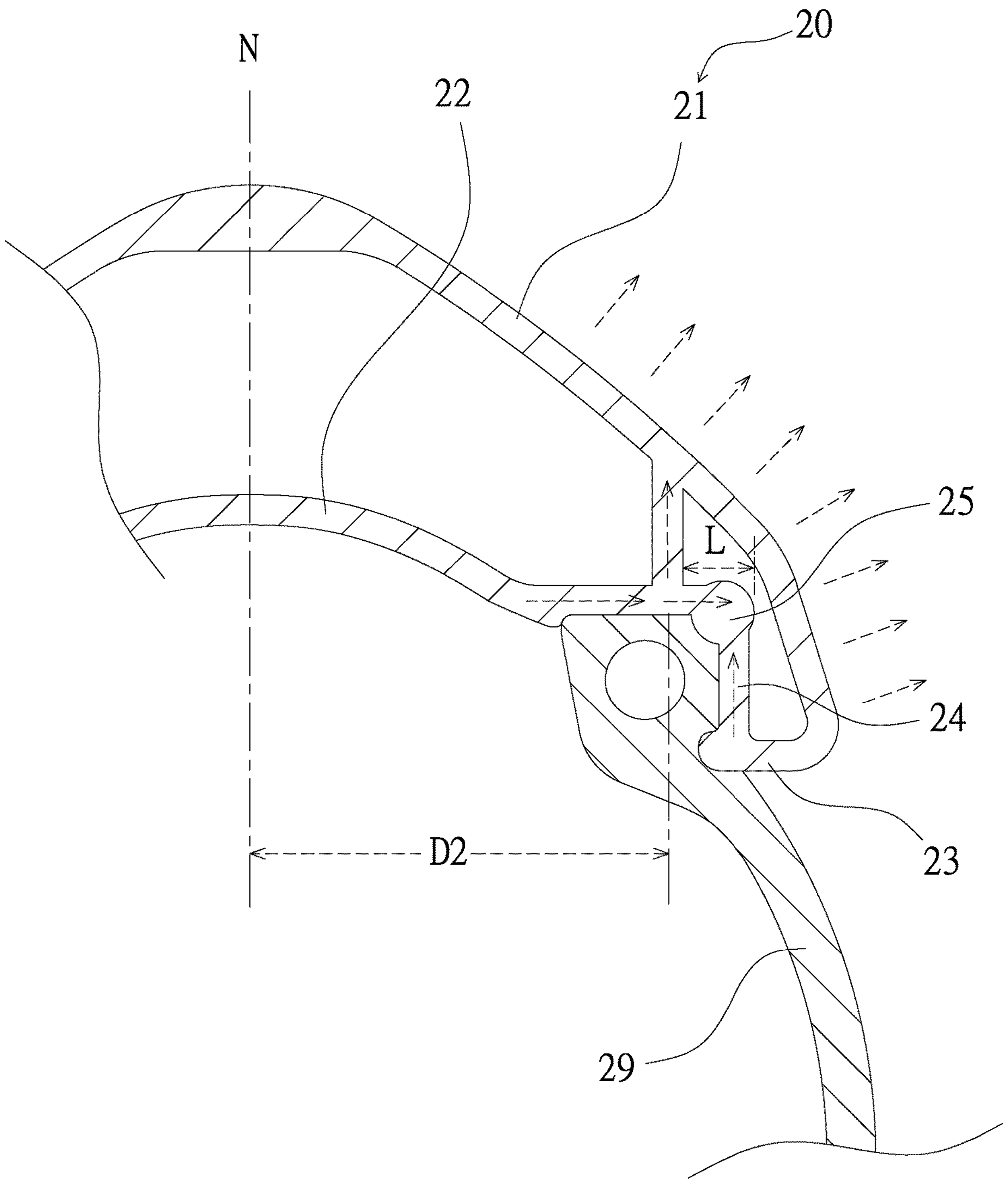
FIG. 5 is a schematic view of the present invention subjected to an external force to disperse the stress.

Referring to FIG. 4 and FIG. 5, the present invention discloses a wheel rim 20 having a reinforcement structure. The wheel rim 20 is an integral ring frame. The wheel rim 20 includes an inner ring having two side walls 21 connected in a V shape and an outer ring having a connecting wall 22. An outer peripheral edge 23 is connected to a distal end of each side wall 21. The outer peripheral edge 23 extends inwardly and axially. Either end of the connecting wall 22 is connected to a connecting edge 24 extending radially. The outer peripheral edge 23 intersects the connecting edge 24. A joint portion 25 is formed at the intersection of the connecting wall 22 and the connecting edge 24. The joint portion 25 is spaced from the corresponding side wall 21. A reinforcement edge 26 is connected between each side wall 21 and the connecting wall 22. A hollow support region 27 is enclosed by the corresponding side wall 21, the outer peripheral edge 23, the connecting edge 24, the connecting wall 22 and the reinforcement edge 26. The connecting wall 22, the outer peripheral edge 23 and the connecting edge 24 form a tire groove 28 for assembling a tire 29. With the above structure, the joint portion 25 and the side wall 21 do not concentrate external force on the side wall 21. Besides, the connecting wall 22 uses the reinforcement edge 26 as a fulcrum to shorten the moment arm, thereby achieving the effect of reducing the external force acting on the wheel rim 20 and dispersing the force.

The assembly, function and effect of the above embodiment are described in detail below. Referring to FIG. 4 and FIG. 5, a predetermined distance L is defined between the reinforcement edge 26 and the joint portion 25. Preferably, the predetermined distance L is between 3 mm and 6 mm. The cross-section of the wheel rim 20 has a central axis N passing through the connecting wall 22. The longer the predetermined distance L is, the shorter the distance between the reinforcement edge 26 and the center axis N is. In other words, the shorter the moment arm D2 of the connecting wall 22, the smaller the moment that can be generated relative to the external force, such that the more stress the wheel rim 20 can resist, the stronger the structure will be.

Furthermore, the joint portion 25 is spaced from the corresponding side wall 21. The stress of the connecting wall 22 and the connecting edge 24 will not be concentrated on the side wall 21, and the stress of the connecting wall 22 is dispersed to the joint portion 25 and the reinforcement edge 26. If the reinforcement edge 26 is used as a fulcrum, the connecting edge 24 provides a moment to resist the moment of the connecting wall 22 on the other side of the fulcrum and offset some stress, and the stress is dispersed over a larger area of the side wall 21 to increase the strength of the support for the external force on the tire 29. In this way, it can reduce the destructive force of "rotation", "twisting" or "bending" caused by the external force on the side wall 21, improve the strength of the side wall 21 against twisting and shearing, and improve the overall structural strength of the wheel rim 20 greatly.

The cross-section of the joint portion 25 in the embodiment of the present invention is circular. The diameter of the joint portion 25 is greater than the thickness of the connecting wall 22 as well as the connecting edge 24, thereby enhancing the strength of the intersection. In actual implementation, the joint portion 25 is not limited to a circular shape and may be designed in a polygonal shape.

In addition, the reinforcement edge 26 of the present invention is a linear edge wall, which transmits a component of the stress on the connecting wall 22 to the side wall 21. Based on the above ideas, the present invention may implement the reinforcement edge 26 as shown in FIGS. 6 to 8.

Figure 6:
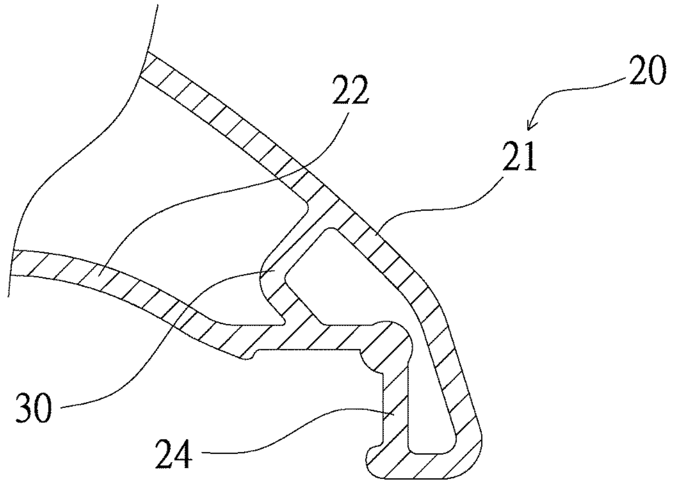
FIG. 6 is a partial cross-sectional view according to an embodiment of the present invention, wherein the reinforcement edge is L-shaped.

Referring to FIG. 6, the reinforcement edge 30 has an L shape. The reinforcement edges 30 of the two side walls 21 are bent toward each other.

Figure 7:
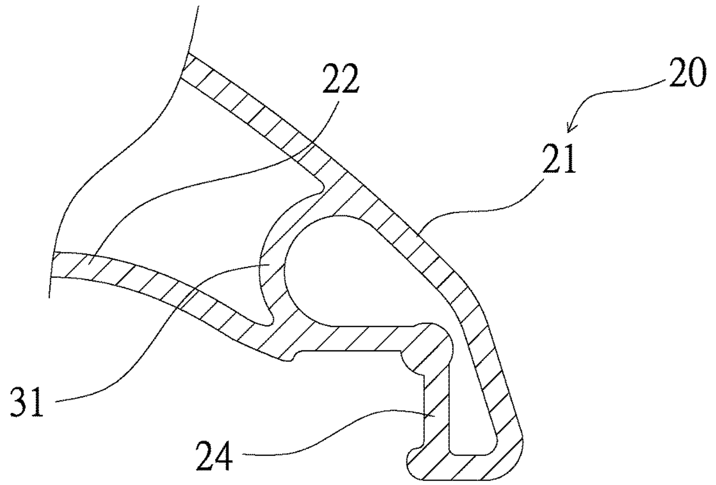
FIG. 7 is a partial cross-sectional view according to an embodiment of the present invention, wherein the reinforcement edge is curved inwardly.

Referring to FIG. 7, the reinforcement edge 31 is curved inwardly. The reinforcement edges 31 of the two side walls 21 are curved toward each other.

Figure 8:
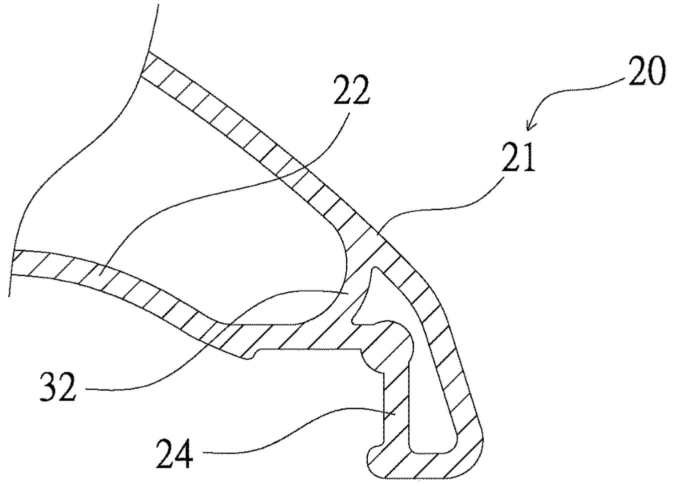
FIG. 8 is a partial cross-sectional view according to an embodiment of the present invention, wherein the reinforcement edge is curved outwardly.

Referring to FIG. 8, the reinforcement edge 32 is curved outwardly. The reinforcement edges 32 of the two side walls 21 are curved away from each other.

The above-mentioned reinforcement edges 30, 31, 32 are non-linear. When subjected to stress, the reinforcement edges 30, 31, 32 can provide elastic deformation to buffer the stress, so that the stress acting on the side wall 21 is less, thereby enhancing the strength of the wheel rim.

With the above structure, the stress transmitted by the tire 29 to the tire groove 28 is transmitted to the joint portion 25 and the reinforcement edge 26 via the connecting wall 22 and to the reinforcement edge 26 via the connecting edge 24. The stress can be dispersed to the side wall 21, so that the external force on the side wall 21 can be borne over a larger area. The wheel rim 20 can withstand greater changes in external forces to prevent the wheel rim 20 from creasing and deforming.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A wheel rim having a reinforcement structure, the wheel rim being an integral ring frame, the wheel rim including an inner ring having two connected side walls and an outer ring having a connecting wall, an outer peripheral edge being connected to a distal end of each side wall, the outer peripheral edge extending axially inwardly, either end of the connecting wall being connected to a connecting edge extending radially, the outer peripheral edge intersecting the connecting edge, a joint portion being formed at an intersection of the connecting wall and the connecting edge, the joint portion being radially spaced from a corresponding one of the side walls, a reinforcement edge being connected between each side wall and the connecting wall, a hollow support region being enclosed by the corresponding side wall, the outer peripheral edge, the connecting edge, the connecting wall and the reinforcement edge, wherein the joint portion has a circular cross-section.

2. The wheel rim as claimed in claim 1, wherein a predetermined distance is defined between the reinforcement edge and the joint portion.

3. The wheel rim as claimed in claim 2, wherein the predetermined distance is between 3 mm and 6 mm.

4. The wheel rim as claimed in claim 1, wherein the joint portion has a diameter greater than a thickness of the connecting wall as well as the connecting edge.

5. The wheel rim as claimed in claim 1, wherein the reinforcement edge is a linear edge wall.

6. The wheel rim as claimed in claim 1, wherein the reinforcement edge is an L-shaped edge wall.

7. The wheel rim as claimed in claim 6, wherein the reinforcement edges of the two side walls are bent toward each other.

8. The wheel rim as claimed in claim 1, wherein the reinforcement edge is an inwardly curved edge wall, and the reinforcement edges of the two side walls are curved toward each other.

9. The wheel rim as claimed in claim 1, wherein the reinforcement edge is an outwardly curved edge wall, and the reinforcement edges of the two side walls are curved away from each other.

* * * * *